(12) United States Patent
Hwu et al.

(10) Patent No.: US 11,995,998 B2
(45) Date of Patent: May 28, 2024

(54) NEURAL NETWORK-BASED SYSTEM FOR FLIGHT CONDITION ANALYSIS AND COMMUNICATION

(71) Applicant: HRL LABORATORIES, LLC, Malibu, CA (US)

(72) Inventors: Tiffany Hwu, Malibu, CA (US); David Huber, Malibu, CA (US); Steven Skorheim, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 211 days.

(21) Appl. No.: 17/225,826

(22) Filed: Apr. 8, 2021

(65) Prior Publication Data

US 2021/0358314 A1 Nov. 18, 2021

Related U.S. Application Data

(60) Provisional application No. 63/025,825, filed on May 15, 2020.

(51) Int. Cl.
*G08G 5/00* (2006.01)
*G06N 3/047* (2023.01)
(Continued)

(52) U.S. Cl.
CPC ........... *G08G 5/0047* (2013.01); *G06N 3/047* (2023.01); *G06N 3/08* (2013.01); *G08G 5/0013* (2013.01);
(Continued)

(58) Field of Classification Search
CPC .. G08G 5/0047; G08G 5/0013; G08G 5/0021; G08G 5/0052; G06N 3/047;
(Continued)

(56) References Cited

U.S. PATENT DOCUMENTS 5,987,397 A * 11/1999 McCool ................. G01G 19/07
702/144
9,701,418 B2 7/2017 Nelson et al.
(Continued)

FOREIGN PATENT DOCUMENTS

CN 110431296 A 11/2019
EP 3 154 038 A1 4/2017
(Continued)

OTHER PUBLICATIONS

Hinton, G.E., et al., Reducing the Dimensionality of Data with Neural Networks, *Science*, vol. 313(5786), 2006, pp. 504-507.
(Continued)

*Primary Examiner* — Abby Y Lin
*Assistant Examiner* — Sohana Tanju Khayer
(74) *Attorney, Agent, or Firm* — Lewis Roca Rothgerber Christie LLP

(57) ABSTRACT

A pilot support system includes: a processing circuit; and memory storing instructions that, when executed by the processing circuit, cause the processing circuit to: receive input data regarding a current state of a vehicle; encode the input data to generate encoded input data; supply the encoded input data to a trained statistical model; compute a current context of the vehicle based on the input data using the trained statistical model; compute one or more pilot feedback indicators based on the current context using the trained statistical model; and provide the one or more pilot feedback indicators to a cockpit of the vehicle.

20 Claims, 9 Drawing Sheets

(51) Int. Cl.
*G06N 3/08* (2023.01)
*B64D 43/00* (2006.01)
*G07C 5/00* (2006.01)

(52) U.S. Cl.
CPC .......... *G08G 5/0021* (2013.01); *B64D 43/00* (2013.01); *G07C 5/00* (2013.01)

(58) Field of Classification Search
CPC .......... G06N 3/08; G06N 3/044; B64D 43/00; B64D 45/00; G07C 5/00
See application file for complete search history.

(56) References Cited

U.S. PATENT DOCUMENTS

| | | | |
|---|---|---|---|
| 9,938,018 B2 | 4/2018 | Welsh et al. | |
| 11,107,001 B1* | 8/2021 | Bertram | G06N 5/022 |
| 11,360,476 B1* | 6/2022 | Greve | B64D 43/00 |
| 11,459,117 B1* | 10/2022 | Shapiro | B64U 10/13 |
| 2014/0156116 A1 | 6/2014 | Nelson | |
| 2015/0007080 A1 | 1/2015 | Nama et al. | |
| 2016/0033582 A1* | 2/2016 | You | G01R 31/392 324/426 |
| 2017/0057658 A1* | 3/2017 | Sabnis | G05D 1/00 |
| 2017/0096236 A1* | 4/2017 | Nelson | B64D 45/00 |
| 2017/0277185 A1 | 9/2017 | Duda et al. | |
| 2018/0268288 A1 | 9/2018 | Vandike et al. | |
| 2018/0304993 A1* | 10/2018 | Offredi | B64D 45/0056 |
| 2019/0325218 A1* | 10/2019 | Freeston | G06T 7/246 |
| 2019/0354838 A1* | 11/2019 | Zhang | G07C 5/085 |
| 2020/0017117 A1* | 1/2020 | Milton | B60W 50/02 |
| 2020/0066165 A1* | 2/2020 | Robertson | G08G 5/006 |
| 2020/0192468 A1* | 6/2020 | Manjon Sanchez | G09G 5/37 |
| 2020/0371491 A1* | 11/2020 | Wong | G05B 13/027 |
| 2021/0004749 A1* | 1/2021 | Orr | B64D 47/08 |
| 2021/0082295 A1* | 3/2021 | Surace | G08G 5/0021 |
| 2021/0097782 A1* | 4/2021 | Dunning | G06F 3/0656 |
| 2021/0171190 A1* | 6/2021 | Bellera | B64C 27/82 |
| 2021/0295166 A1* | 9/2021 | Rouhani | G06N 3/045 |
| 2022/0411079 A1* | 12/2022 | Stothers | B64D 15/20 |

FOREIGN PATENT DOCUMENTS

| | | |
|---|---|---|
| GB | 2567850 A | 5/2019 |
| WO | WO 00/25272 | 5/2000 |
| WO | WO 2008/127468 A2 | 10/2008 |

OTHER PUBLICATIONS

Radford, A., et al., Unsupervised Representation Learning with Deep Convolutional Generative Adversarial Networks, arXiv preprint arXiv: 1511.06434, 2015, 16 pages.

Salakhutdinov, R., et al., Deep Boltzmann Machines. In *Artificial intelligence and statistics,* (Apr. 2009), pp. 448-455.

International Search Report and Written Opinion for International Application No. PCT/US2021/026615 dated Feb. 3, 2022, 7 pages.

Extended European Search Report for Application No. EP 21 80 9638, dated Mar. 19, 2024, 8 pages.

* cited by examiner

NEURAL NETWORK-BASED SYSTEM FOR FLIGHT CONDITION ANALYSIS AND COMMUNICATION

CROSS-REFERENCE TO RELATED APPLICATION(S)

This application claims priority to and the benefit of U.S. Provisional Patent Application No. 63/025,825, filed in the United States Patent and Trademark Office on May 15, 2020, the entire disclosure of which is incorporated by reference herein.

FIELD

Aspects of embodiments of the present disclosure relate to systems and methods for analyzing flight conditions using neural networks and user interfaces for communicating flight analysis information to pilots.

BACKGROUND

When flying an aircraft, a human pilot integrates information from a wide variety of different standard sensors or instruments to maintain situational awareness. Different measurements from the sensors and instruments may indicate different operating contexts for the pilot, which may correspond to different stages of flight, such as takeoff, ascent, cruising, descent, and landing, and which may also include other contexts such as low visibility situations, storm situations, turbulence, and partial failures of aircraft systems. Information from different instruments may have different levels of relevance or importance under different operating contexts. Furthermore, the pilot may respond to the particular conditions by actuating various aircraft controls, such as by steering around turbulence.

SUMMARY

Aspects of embodiments of the present disclosure relate to systems and methods for analyzing flight conditions using neural networks and user interfaces for communicating flight analysis information to pilots. For example, in some embodiments, a neural network or other statistical model receives sensor input to categorize the current flight conditions into one of a plurality of different flight contexts. In some embodiments, the neural network or other statistical model also predicts or estimates the values of missing sensor inputs based on the detected current flight context. In some embodiments, the neural network or other statistical model reports the results of its analysis through the aircraft instrumentation. In various embodiments, the results of the analysis include indicators of instruments that are of particular importance in the current flight context, inferred semantic labels regarding the current context based on the sensor input, and indications of control suggestions for responding to the current flight conditions.

According to one embodiment of the present disclosure, a pilot support system includes: a processing circuit; and memory storing instructions that, when executed by the processing circuit, cause the processing circuit to: receive input data regarding a current state of a vehicle; encode the input data to generate encoded input data; supply the encoded input data to a trained statistical model; compute a current context of the vehicle based on the input data using the trained statistical model; compute one or more pilot feedback indicators based on the current context using the trained statistical model; and provide the one or more pilot feedback indicators to a cockpit of the vehicle.

The trained statistical model may include a neural network.

The neural network may include a Restricted Boltzmann Machine.

The input data may include cockpit sensor data and cockpit controls data.

The vehicle may be an aircraft, the cockpit sensor data may include: aircraft pitch and aircraft yaw, and the cockpit controls data may include: flight stick position.

The trained statistical model may be trained using training data corresponding to operations by an expert pilot, the training data including: training sensor data; training cockpit control data; and semantic labels associated with different contexts.

The instructions to encode the input data may include instructions that, when executed by the processing circuit, cause the processing circuit to: divide the input data into a plurality of time windows; and generate summary values for each time window, the summary values including: a mean; a maximum; and a minimum.

The pilot feedback indicators may include instruments relevant to the current context, and the instructions to provide the one or more pilot feedback indicators may include instructions that, when executed by the processing circuit, cause the processing circuit to illuminate lights associated with the instruments relevant to the current context.

The pilot feedback indicators may include proposed control actuations, and the instructions to provide the one or more pilot feedback indicators may include instructions that, when executed by the processing circuit, cause the processing circuit to display a proposed direction for a cockpit control to be actuated.

The pilot feedback indicators may include a semantic label, and the instructions to provide the one or more pilot feedback indicators may include instructions that, when executed by the processing circuit, cause the processing circuit to display the semantic label on a display device in the cockpit.

According to one embodiment of the present invention, a method for providing feedback to a pilot includes: receiving, by a processing circuit, input data regarding a current state of a vehicle operated by the pilot; encoding, by the processing circuit, the input data to generate encoded input data; supplying, by the processing circuit, the encoded input data to a trained statistical model; computing, by the processing circuit, a current context of the vehicle based on the input data using the trained statistical model; computing, by the processing circuit, one or more pilot feedback indicators based on the current context using the trained statistical model; and providing, by the processing circuit, the one or more pilot feedback indicators to a cockpit of the vehicle.

The trained statistical model may include a neural network.

The neural network may include a Restricted Boltzmann Machine.

The input data may include cockpit sensor data and cockpit controls data.

The vehicle may be an aircraft, the cockpit sensor data may include: aircraft pitch and aircraft yaw, and the cockpit controls data may include: flight stick position.

The trained statistical model may be trained using training data corresponding to operations by an expert pilot, the training data including: training sensor data; training cockpit control data; and semantic labels associated with different contexts.

The encoding the input data may include: dividing the input data into a plurality of time windows; and generating summary values for each time window, the summary values including: a mean; a maximum; and a minimum.

The pilot feedback indicators may include instruments relevant to the current context, and the providing the one or more pilot feedback indicators may include illuminating lights associated with the instruments relevant to the current context.

The pilot feedback indicators may include proposed control actuations, and the providing the one or more pilot feedback indicators may include displaying a proposed direction for a cockpit control to be actuated.

The pilot feedback indicators may include a semantic label, and the providing the one or more pilot feedback indicators may include displaying the semantic label on a display device in the cockpit.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
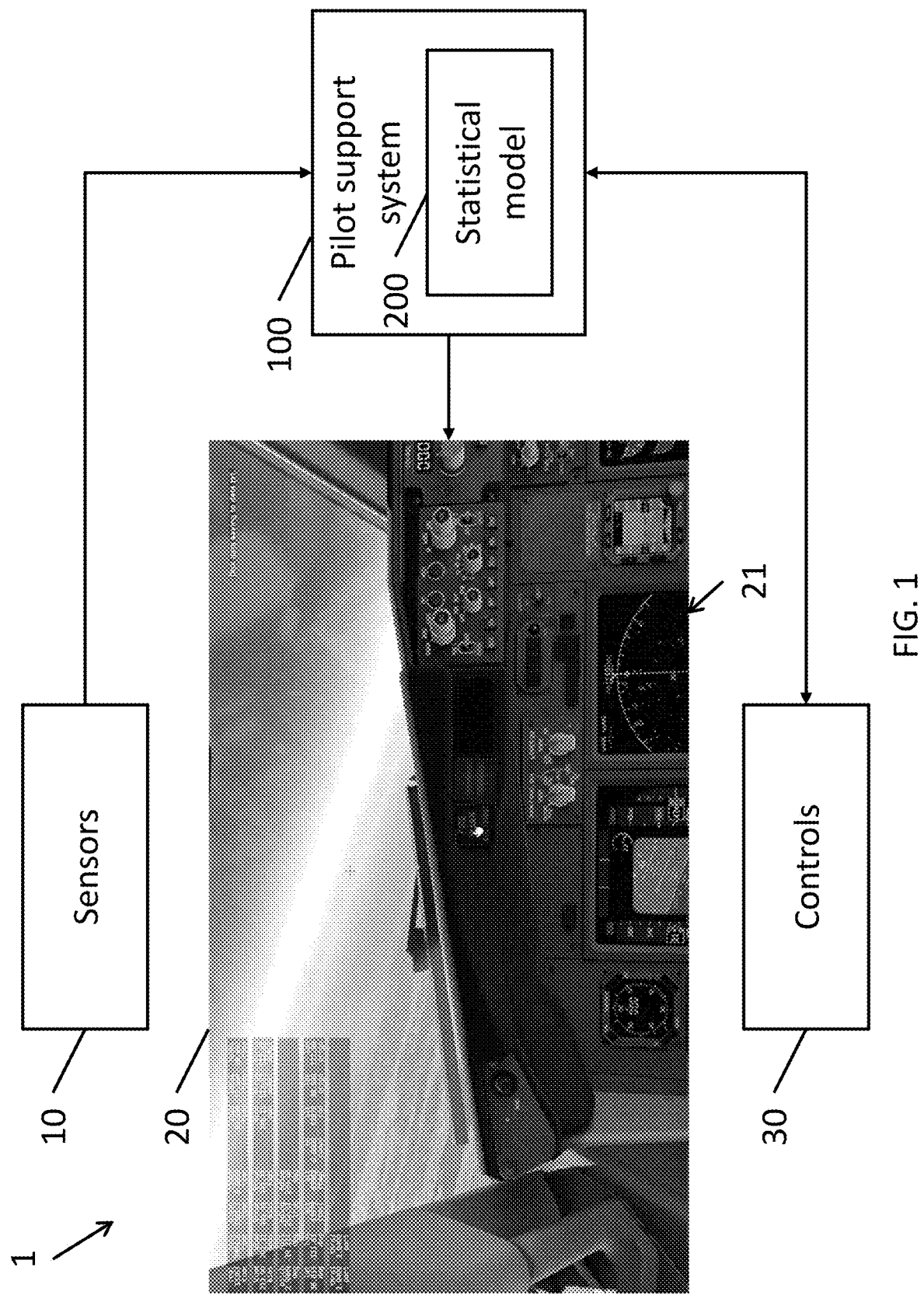
FIG. 1 is a schematic block diagram illustrating a role of a pilot support system according to one embodiment of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention relate to pilot support, including systems and methods that continuously detect flight conditions and communicate situational context information to pilots operating an airplane. While various embodiments of the present disclosure are described herein with respect to support of pilots flying airplanes, embodiments of the present disclosure are not limited thereto and can also be applied to other systems for assisting pilots in the operation of vehicles such as other types of aircraft (e.g., gliders and helicopters), land vehicles (e.g., cars and trucks), and watercraft (e.g., boats, ships, and submarines). In addition, embodiments of the present disclosure may be adapted to the operation of other machinery, such as machine tools, woodworking tools, and other equipment in which sensors are used to provide feedback to a user who controls the machinery.

Various vehicles may include a wide variety of sensors and other instruments to provide a pilot with information about the current state of the vehicle. A land vehicle may include a speedometer to indicate the current land speed and a tachometer to indicate the current engine speed. An aircraft may include flight instruments such as an altimeter, an airspeed indicator, a vertical speed indicator, a heading indicator (e.g., compass), gyroscopic pitch-bank (e.g., artificial horizon), and the like. A submarine may include instruments indicating current depth, vertical and horizontal speed, buoyancy, and the like.

Many vehicles include various levels of autonomous operation, such as the autopilot functionality of an aircraft and advanced driver-assistance systems (ADAS) and various levels of automation in automobiles. Nevertheless, some tasks are very difficult to automate, but many others are much more effectively handled by automated systems than by humans. This creates a challenge of how to distribute the task load between human and machine effectively.

When operating a vehicle, human pilots are exposed to large amounts of information, most of which is irrelevant to the majority of situations the plane will experience. Through training and experience, a pilot may learn to determine the current conditions of the vehicle being piloted based on the outputs of various combinations of different instruments, which may have very different normal operating values depending on context (e.g., airspeed during cruising versus while landing or while taxiing) and to know which information is relevant to the current context. Nevertheless, effective cueing of the relevant information may be able to help pilots understand changing conditions and to improve response time.

Rapid and intuitive communication between human pilots and assistive machines improve the control of planes and other vehicles, thereby improving safety and performance of the operation of the vehicle. Embodiments of the present disclosure detect flight conditions and status based on combining information from a wide variety of different inputs regarding the current state of the vehicle, including sensor data, current control data, and data from external sources, supporting a broad span of human-machine teaming operations. Embodiments of the present disclosure are also capable of identifying abnormal flight conditions before humans are able to, thereby improving aircraft safety. As such, aspects of embodiments of the present disclosure relate to systems and methods for improving communication between the pilot, the vehicle, and the autonomous operation functionality of the vehicle.

FIG. 1 is a schematic block diagram illustrating a role of a pilot support system according to one embodiment of the present disclosure. As shown in FIG. 1, a vehicle 1 such as an aircraft may include a collection of sensors 10 a cockpit 20 for a pilot, and controls 30 in the cockpit 20. Various instruments 21 within the cockpit 20 may report on information collected by the sensors 10 (e.g., an artificial horizon instrument may provide information from a gyroscopic sensor). In addition, various controls 30 within the cockpit 20 allow the pilot to control the vehicle, such as a throttle to control the engine power (in the case of an aircraft, this may also include a joystick or flight stick for controlling the pitch and yaw and pedals for controlling a rudder).

More generally, a pilot support system 100 according to embodiments of the present disclosure receives streams of current information from a variety of different sources such as: sensors 10 embedded in the vehicle (e.g., current pitch, yaw, altitude, airspeed, vertical speed, and the like of an aircraft); internal data sources (e.g., static data loaded from computer systems on board the vehicle such as maps); data from external sources (e.g., dynamic and/or static data received over a communication network such as Global Positioning System data and weather information); cockpit control information (e.g., the current positions and settings of various controls 30 such as the throttle, flight stick, and rudder and the like); and other information regarding the current state of the vehicle, such as semantic labels of conditions. In some embodiments, the relevance of various instruments is determined by comparing the values computed by a pilot support system (see FIG. 5B) that are generated based on a particular context detection to nominal or average values for these outputs to identify instruments that currently show abnormal values (e.g., outlier values) that may be different (e.g., statistically significantly different) than the nominal values. In addition, in some embodiments of the present disclosure, the pilot support system has access to information about the actions of the pilot through the cockpit control information and potentially other sensors tracking the activity of the pilot (e.g., camera systems to determine the pilot's current physical pose, such as which direction the pilot is facing, eye tracking to determine where the pilot is currently looking, and pressure sensors to determine what controls the pilot is touching, either prior to or while actuating those controls).

However, many important conditions may not be readily apparent by any single sensor input. A neural network (or other statistical model 200) trained on these streams of information can be used to identify these complex conditions or combination of conditions based on multiple inputs regarding the current conditions in order to create a "context." The context, such as weather-based contexts like "stormy weather" or "freezing clouds," and vehicle-based contexts like "engine failure," "cabin fire," or decompression," once identified, will change what information will be of the most immediate value to the human pilot and the autonomous piloting systems. The system will then highlight the most immediately relevant instruments (e.g., gauges) and controls.

Some aspects of embodiments of the present disclosure relate to a training phase in which a stream of sensor data from the vehicle (e.g., an airplane) is combined with control data and semantic labeling of conditions. These data are used as input for training a statistical model (such as a neural network) that hierarchically clusters the data into different contexts (e.g., using unsupervised learning). Some additional aspects of embodiments of the present disclosure relate to use of a trained statistical model (e.g., a neural network) during an operation phase or deployment phase, where the pilot support system outputs cues such as visual attention zones and semantic labels that bring attention to condition-specific information. In some embodiments of the present disclosure, the pilot's actions are fed back into the control system allowing for two-way learning as the pilot support system learns from the pilot feedback while the pilot is learning to work with the pilot support system. Some aspects of embodiments of the present disclosure further relate to controlling switching between modes of operation for the integrated pilot support system.

In more detail, aspects of embodiments of the present invention include the division of input data into sensory, control, and semantic types, and the reporting of flight conditions using these same divisions. Rather than monitoring an individual system, pilot support systems according to embodiments of the present disclosure monitor a vast array of sensors, determine the relative importance of each ("importance values"), and direct the pilot's attention toward those relevant instruments. In some embodiments, the relative importances or importance values are determined based on whether and how much the current output values differ from nominal values (e.g., average values or typical values). In some embodiments, the relative importance is determined by comparing the output values shown in FIG. 5B with the average (e.g., by subtracting the average or mean values from the output values to compute difference values that represent the importance values). The resulting difference then correlates to the relative importance. In some embodiments, statistical information typical of the outputs are also known, and the importance values are calculated in units of standard deviations from the mean value. This is advantageous in situations where human pilots must quickly adapt to the situational context, such as when switching between autopilot and manual modes of operation. In this case, embodiments of the present disclosure can reduce the time it takes to recover from performance decreases when the switch occurs.

In some embodiments, the content and format of the status output from the pilot support system 100 depends on the content and format of the input to the neural network. for example, if the input includes readings from a selection of flight instruments, the output will report the flight condition or flight context by directing attention toward the flight instruments relevant to the condition. As another example, if the input includes information about the positions of pilot controls 30 in the cockpit 20, then the output may include suggested actions to be taken by highlighting individual controls (e.g., blinking a light on the control) and indicating the direction in which the individual control may be manipulated (e.g., toggling a switch or moving a throttle in a particular direction). As a third example, if the input includes semantic information or labels about the presence of particular conditions (e.g., turbulence), then the output may include similar semantic labels, which may be displayed to the pilot, such as on a display in the cockpit 20 (e.g., on a dashboard of a land vehicle or on a multi-function display of an instrument panel of an aircraft)

Pilot support systems according to various embodiments of the present disclosure may implemented in and be integrated into the vehicle in a variety of different ways. In various embodiments of the present disclosure, pilot support systems 100 are implemented using a computer system that includes an electronic processing circuit. The processing circuit may include one or more processors and one or more memory modules storing instructions that, when executed by the one or more processors, cause the one or more processors to execute operations to implement the systems and methods of embodiments of the present disclosure. The one or more processors may include combinations of various types of different processing circuits, such as a central processing unit (CPU), a graphics processing unit (GPU), a field programmable gate array (FPGA), a tensor processor, an artificial intelligence (AI) accelerator (e.g., a processing circuit designed to perform operations commonly found in artificial intelligence algorithms such as forward propagation in neural networks, such as dot products, activation functions, and the like), a digital signal processor (DSP), an application specific integrated circuit (ASIC), or the like. The computing system implementing pilot support systems may be integrated with other existing computing systems of the vehicle, such as flight computers, existing autopilot, ADAS systems of vehicles, and the like, or may be implemented using separate hardware in communication with existing computing systems of the vehicle over a communications bus such as a Controller Area Network (CAN) bus.

Aspects of embodiments of the present disclosure may operate in two phases, including a training phase, during which input training data is processed and encoded into a format for use with a statistical model, where the statistical model is trained based on the training data. For example, in a case where the statistical model includes a neural network, in a supervised learning process this may include supplying the encoded input data to the neural network in a forward propagation or inference mode, then comparing the output of the network, computed based on a set of parameters, to an expected output (e.g., based on labeled training data) and updating the parameters to reduce the error between the computed output and the expected output (e.g., using the backpropagation algorithm and gradient descent), or using an unsupervised learning process to automatically cluster the training data into a plurality of different clusters. Details of example methods of training a statistical model according to embodiments of the present disclosure will be presented in more detail below.

During operation, a trained statistical model 200 recognizes a current operational context given the current inputs to the statistical model 200, and the pilot support system 100 reports the current operational context to the pilot via one or more interfaces tailored to the categories of inputs.

Figure 2:
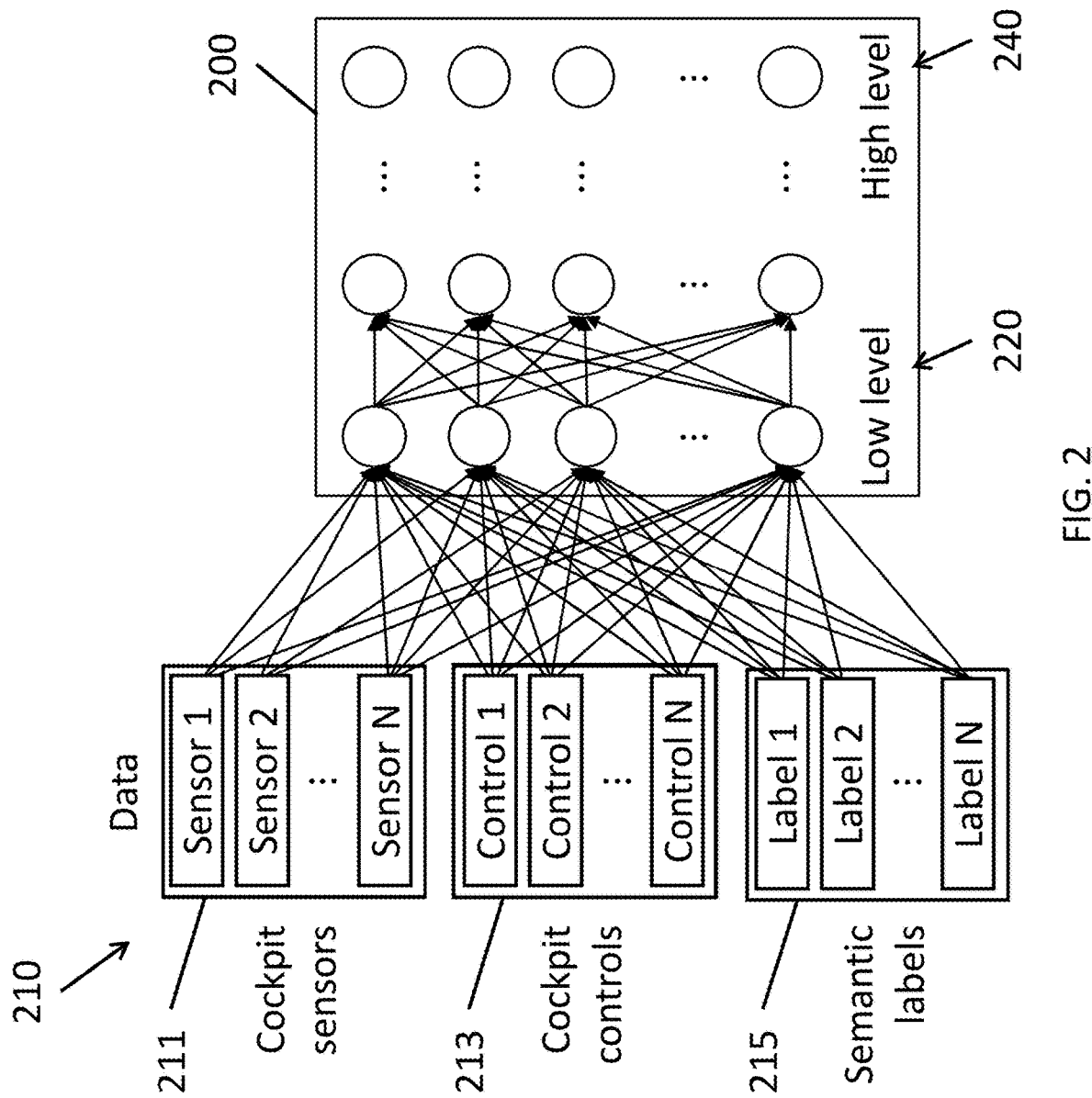
FIG. 2 is a schematic block diagram illustrating a process for training a statistical model, in particular, a neural network, as a component of a pilot support system according to one embodiment of the present disclosure.
Figure 3:
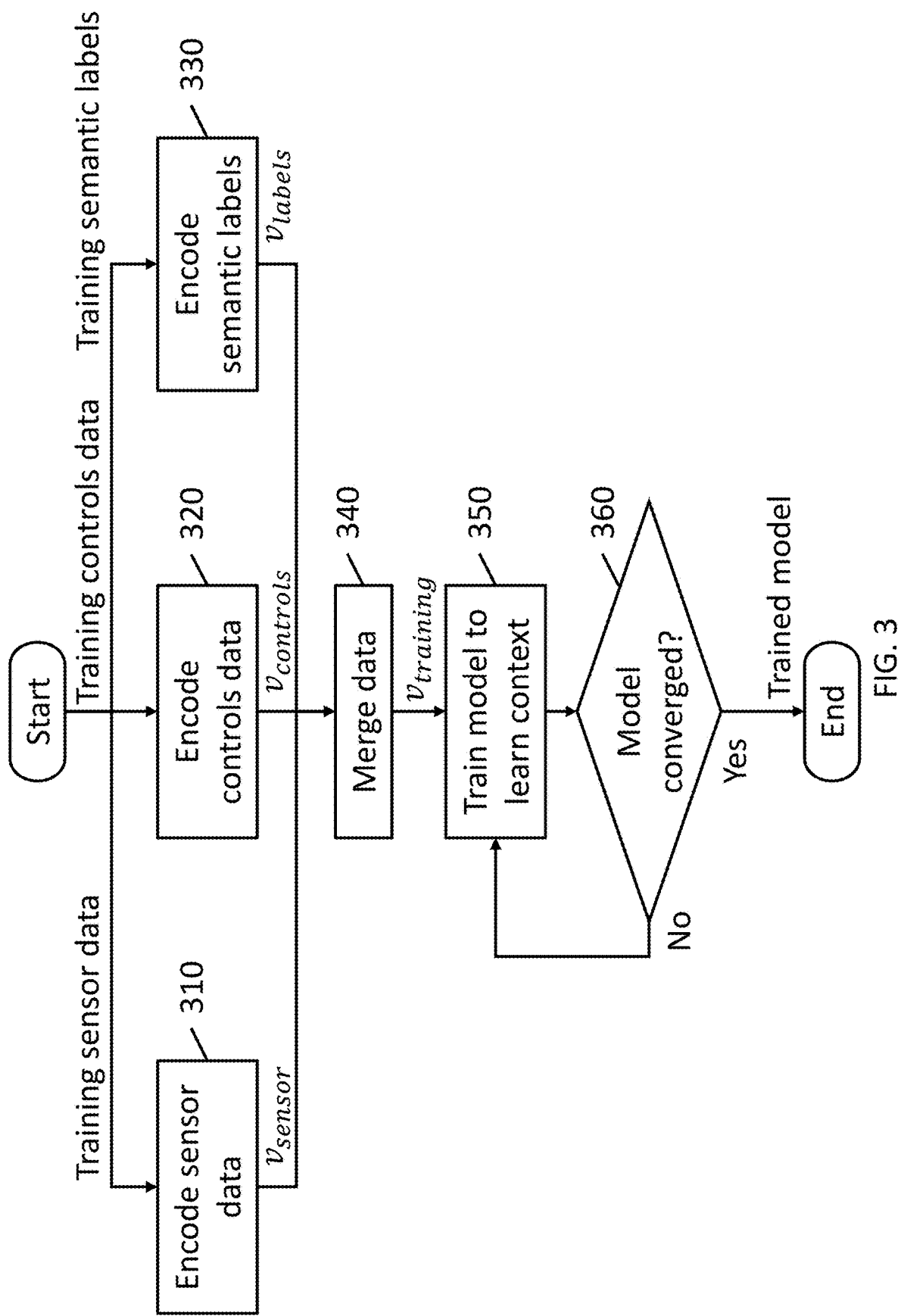
FIG. 3 is a flowchart of a method for training a statistical model, such as a neural network, as a component of a pilot support system according to one embodiment of the present disclosure.

FIG. 2 is a schematic block diagram illustrating a process for training a statistical model, in particular, a neural network, as a component of a pilot support system according to one embodiment of the present disclosure. FIG. 3 is a flowchart of a method for training a statistical model, such as a neural network, as a component of a pilot support system according to one embodiment of the present disclosure.

As shown in FIG. 2, the input training data 210 to the statistical model 200 are categorized into three categories: cockpit sensors 211, cockpit controls 213, and semantic labels 215. During the training phase, complete vectors of data corresponding to points in time are used as input for generating a hierarchical context representation using the statistical model 200. In some embodiments of the present disclosure, these complete vectors of input training data 210 are obtained from recordings of flights by expert pilots. During the recording of this training data, the values of the cockpit sensors 211 (e.g., the current pitch, yaw, and altitude of the aircraft, load, flap and slat position, cabin pressure, temperature, humidity, brake torque sensors, health and usage monitoring systems (HUMS), angle of attack (AOA), air speed, engine speed (RPM), and various status indication lights) are continuously sampled and saved, along with the states of the controls 213 (e.g., current position of the throttle, the rudder, the flight stick, the brakes, flap positions, navigation and autopilot settings, and switches such as de-icing, lights, and power) as manipulated by the expert pilot, along with semantic labels 215 of the flight condition. These semantic labels 215 may be generated by the expert pilot during recording, or as a post-processing step when reviewing the data. In some embodiments, data is captured or sampled at a rate of 10 samples per second (or 10 Hz), although embodiments of the present disclosure are not limited there to and higher sample rates or lower sample rates may be used. In some embodiments of the present disclosure, the sampling rate is sufficiently high to capture substantially real-time information (e.g., no more than a few seconds between samples).

According to some embodiments of the present disclosure, the statistical model 200 includes a neural network to create a hierarchical representation of current vehicle context. The lowest level of hierarchy of representation 220 may include common clusters of sensor inputs such as maneuvering patterns or co-occurring sensor values, whereas the highest level of hierarchy 240 may encompass broad categories of conditions, such as turbulence or mechanical failures. Examples of neural network architectures suitable for hierarchical clustering include a deep restrictive Boltzmann machine (see, e.g., Salakhutdinov, R., & Hinton, G. (2009, April). Deep Boltzmann machines. In *Artificial intelligence and statistics* (pp. 448-455).); a deep autoencoder (see, e.g., Hinton, G. E., & Salakhutdinov, R. R. (2006). Reducing the dimensionality of data with neural networks. *Science*, 313(5786), 504-507.) and/or a generative adversarial network (see, e.g., Radford, A., Metz, L., & Chintala, S. (2015). Unsupervised representation learning with deep convolutional generative adversarial networks. arXiv preprint arXiv:1511.06434.). Each of the clusters identified through the training of the statistical model may represent a different operating context for the vehicle. Some of these operating contexts may require a response from a pilot. For example, turbulence condition may require a pilot to steer an aircraft out of the pocket of turbulence. As another example, a stoplight condition may require a driver to slow an automobile when approaching an intersection.

Referring to FIG. 3, training data from recorded sensor data and cockpit control data, as captured while a vehicle is operated by an expert pilot, is supplied as input to the training process. As noted above, the data may be captured at a sampling rate such as 10 Hz, where the data from the different sources are time aligned, and where each data source corresponds to one or more streams of time series data. The operations shown in FIG. 3 may be performed by a training system, such as a computer system, which may include an electronic processing circuit. The processing circuit may include one or more processors and one or more memory modules storing instructions that, when executed by the one or more processors, cause the one or more processors to execute operations to implement the systems and methods of embodiments of the present disclosure. The one or more processors may include combinations of various types of different processing circuits, such as a central processing unit (CPU), a graphics processing unit (GPU), a field programmable gate array (FPGA), a tensor processor, an artificial intelligence (AI) accelerator (e.g., a processing circuit designed to perform operations commonly found in artificial intelligence algorithms such as forward propagation in neural networks, such as dot products, activation functions, and the like), a digital signal processor (DSP), an application specific integrated circuit (ASIC), or the like. Generally, a process for training a statistical model is much more computationally intensive than operating the statistical model (e.g., using the statistical model to perform inferences or predictions). As such, statistical models according to embodiments of the present invention may be trained "offline," e.g., using hardware different from that which executes the models as a component of a pilot support system 100. For example, a training system may include one or more computer servers, and may run in a cloud environment (e.g., in a data center).

In the embodiment shown in FIG. 3 the training data 210 includes training sensor data 211, training cockpit controls data 213, and training semantic labels 215. As shown in FIG. 3, in operation 310, the training sensor data 211 is encoded into a form appropriate for use with the statistical model 200, in operation 320, the training controls data 213 is encoded into a form appropriate for use with the statistical model 200, and, in operation 330, the training semantic labels 215 are encoded into a form for use with the statistical model 200. For example, in some embodiments of the present disclosure, continuous values such as speed, altitude, the position of controls, and the like, may be encoded into floating point values within a particular range (e.g., in a continuous range from 0 to 1 or in a range from 0 to 255). In some embodiments of the present disclosure, values may be transformed between different representation spaces (e.g., non-linear values may be translated into a linear space, such as by applying a square root function to values that are in a quadratic space). In some embodiments of the present disclosure, discrete values are encoded using discrete values. For example, semantic labels 215 may be encoded using binary values such as 0 and 1 indicating the absence and presence of those labels, respectively. As another example, semantic labels that fall along a progression of degree may be labeled using consecutive values (e.g., level of storm as indicated from a weather report).

In addition, in some embodiments of the present disclosure, the streams of data are binned into time windows, where each time window may include multiple samples for each data stream (e.g., for each sensor input and for each cockpit control input). Accordingly, encoding the data may include computing aggregate or summary values for each data stream based on the values within a given time window. These aggregate or summary values may include: a mean, a maximum, a minimum, a variance or standard deviation, a norm, and the like. For example, sensor data may be collected from each sensor at a sampling rate of 10 Hz and grouped into time windows of 1 second, such that each time window includes 10 samples. The 10 samples collected from a given sensor over the 1 second time window are then used to compute the summary values described above, to generate a vector of input features related to the sensor for the given time window. To be more specific, the input sensor data may include pitch, yaw, and altitude. For a given time window, there may be 10 pitch values, 10 yaw values, and 10 altitude values. Summary values may be computed for each of these sensors. For example, for a yaw sensor, a vector for the time window may include: mean yaw; maximum yaw; minimum yaw; standard deviation of yaw; norm of yaw; etc. Likewise, for a pitch sensor, a vector for the same time window may include: mean pitch; maximum pitch; a minimum pitch; standard deviation of pitch, norm of pitch, etc.

As noted above, in some embodiments of the present disclosure, the statistical model 200 includes a Restricted Boltzmann Machine, which is one type of statistical model that is capable of hierarchical clustering and bidirectional information flow for use with pilot support systems 100 according to embodiments of the present disclosure. In its simplest form, the Restricted Boltzmann Machine includes two layers, a visible layer and a hidden layer, represented by vectors v and h, respectively. However, embodiments of the present disclosure are not limited thereto and may include deep neural networks (e.g., a Restricted Boltzmann Machine with more than two layers). Accordingly, in such embodiments, the encoding of the training sensor data 211, the training controls data 213, and the training semantic labels 215 performed in operations 310, 320, and 330, encodes these data into respective training vectors v (e.g., $v_{sensor}$, $v_{controls}$ and $v_{labels}$). In operation 340, the training system merges the data from the different sources to generate merged training vectors ($v_{training}$) of time series data, where data from the different sources are aligned in accordance with their timestamps (e.g., where each "data point" of the training vectors corresponds to the values of the sensors, the controls, and the semantic labels at a particular point in time or during a particular window of time).

The weights connecting the visible layer and the hidden layer are represented by matrix W. (In embodiments with a deep neural network having more than two layers, such as the embodiment shown in FIG. 2, there is a separate matrix W for representing the connections between each pair of layers.) An energy level of the state of the network is defined as shown in Equation (1):

$$E(v,h;W) = -v^T W h \quad (1)$$

In some embodiments of the present disclosure, the individual units in v and h are probabilistic binary units that have a value of 1 or 0, where the input data to the Boltzmann network can be set in the vector v for the visible layer. In the absence of external input, the model assigns a probability to vector v in accordance with Equations (2) and (3):

$$p(v; W) = \frac{p^*(v; W)}{Z(W)} \sum_h \exp(-E(v, h; W)) \quad (2)$$

$$Z(W) = \sum_v \sum_h \exp(-E(v, h; W)) \quad (3)$$

where $p^*(v; W)$ is an unnormalized probability and $Z(W)$ is a partition function. The state probabilities of each hidden unit j (e.g., j-th hidden unit $h_j$) or visible unit i (e.g., i-th visible unit $v_i$) are represented by the Equations (4) and (5):

$$p(h_j = 1 \mid v, h_{-j}) = \sigma\left(\sum_{i=1}^{D} W_{ij} v_i\right) \quad (4)$$

$$p(v_i = 1 \mid h, i_{-i}) = \sigma\left(\sum_{j=1}^{P} W_{ij} h_j\right) \quad (5)$$

where $\sigma(x) = 1/(1+\exp(x))$, D is the length of v, and P is the length of h. The learning rule for the weight matrix W is represented as shown in Equations (6), (7), and (8):

$$\Delta W = \alpha(E_{P_{data}}[vh^T] - E_{P_{model}}[vh^T]) \quad (6)$$

$$P_{data}(h, v; W) = P(h \mid v; W) P_{data}(v) \quad (7)$$

$$P_{data}(v) = \frac{1}{N} \sum_n \delta(v - v_n) \quad (8)$$

where a is the learning rate. The learning rule (e.g., as shown in Equations (6), (7), and (8)) expresses the divergence of the data-dependent expectation, $E_{P_{data}}$, and the model expectation, $E_{P_{model}}$. $P_{data}$ is the data-dependent probability distribution of the network activity when v is held at a constant input value from the dataset whereas $P_{model}$ is the probability distribution of the default network activity, from Equation (2). In operation 350, the training system uses the merged training vectors to train a model to learn operation contexts for the vehicle. Training on a full dataset includes applying the learning rule to each of the data points in the training set (e.g., each training vector $v_{training}$ for each point in time or time window, where the data points may be supplied in random order), and determining if the model has converged in operation 360. If the model has not converged, then training continues in operation 350, such as by continuing to apply the learning rule to update the weights W of the network until convergence. Convergence is reached when the energy level E(v, h; W) of the network (see Equation (1)) ceases to change significantly when applying the learning rule on data points in the dataset. The result of the training process, as shown in FIG. 3, is a trained statistical model 200.

As one concrete example of a training process for a statistical model according to one embodiment of the present disclosure, data was collected from a flight simulator software system, where data streams from cockpit sensors and semantic labels were used to train a statistical model 200 according to embodiments of the present disclosure to detect clear weather versus stormy weather.

In order to collect training data, two flight contexts of clear weather and stormy weather were generated using the weather customization feature of the flight simulator software system. For each of these two contexts, approximately 30 minutes of data was recorded from the simulated sensors while flying at a constant altitude. For the purposes of this example, pitch and roll values from the data were collected at approximately 10 Hz in real time from the simulator. The data was then chunked into blocks of 1 second time windows. The data from each block was then preprocessed by calculating the number of sign changes, numbers of traversals over the mean, mean, standard deviation, norm, maximum, and minimum, such that 7 summary values were calculated for each raw input (roll and pitch), resulting in 14 data inputs These values were saved for training the neural network 200 for context recognition. In addition, two empty semantic inputs were included during training, with one input set to 1 during clear conditions (a clear context) and the other input set to 1 during stormy conditions (a stormy context). Combined with the semantic inputs, v was of size 16, and h was set to a size of 2. The neural network 200 was trained on the entire dataset for 1,000 epochs.

Operation Phase
Flow of Information

As noted above, during the training phase, information flows forward from the input sensors to the neural network for context representation. On the other hand, during the operation phase, information first flows forward through the trained statistical model 200 in order to recognize a current context of operation (e.g., cruising, turbulence, landing, taxiing, etc.). Information then flows backward, providing reconstructions of input data that were not initially provided. The reconstructed input data flows further backward to the interface designed to convey the information intuitively to the pilot.

Figure 4B:
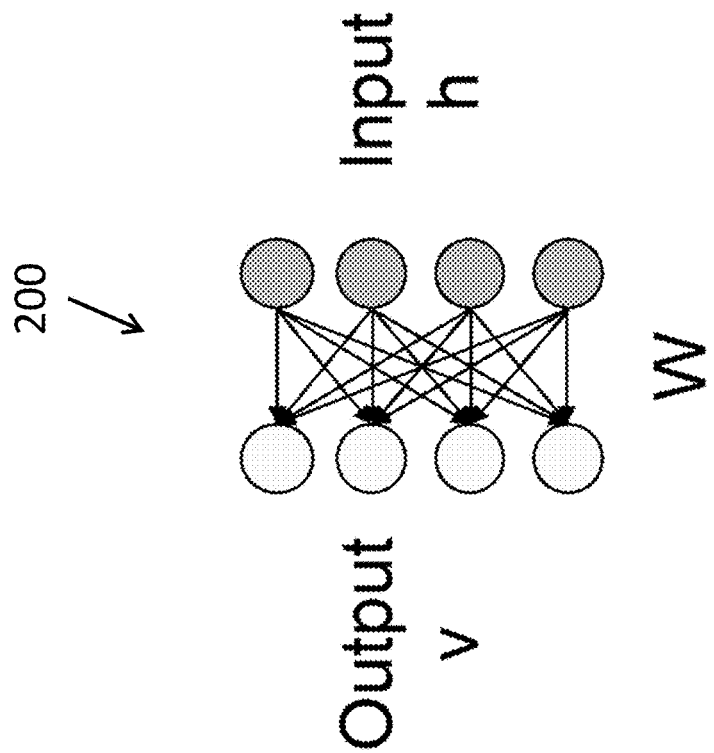
FIGS. 4A and 4B are a schematic depictions of information flow through the trained statistical model when it is used to report contextual conditions during operation such as while an aircraft is in flight.
Figure 4A:
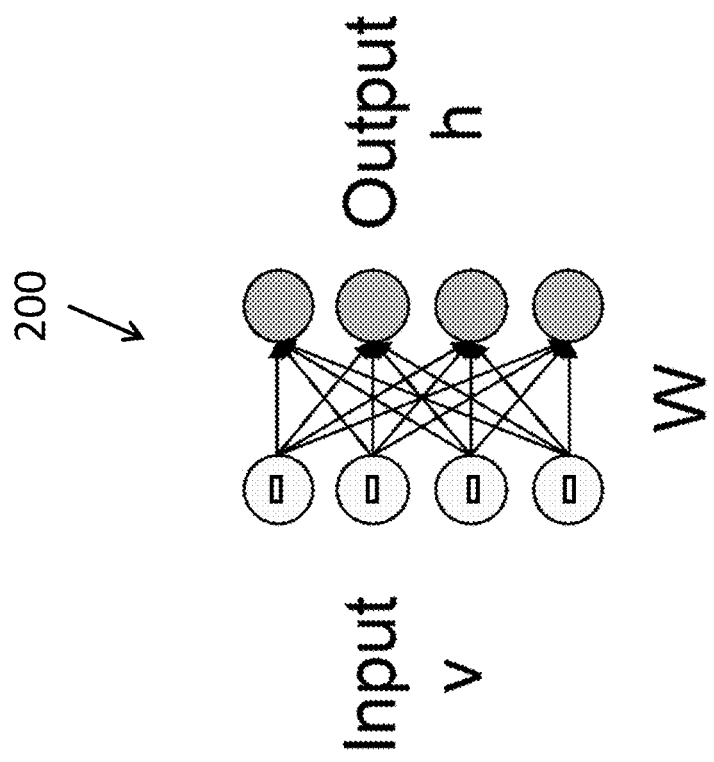
Figure 5A:
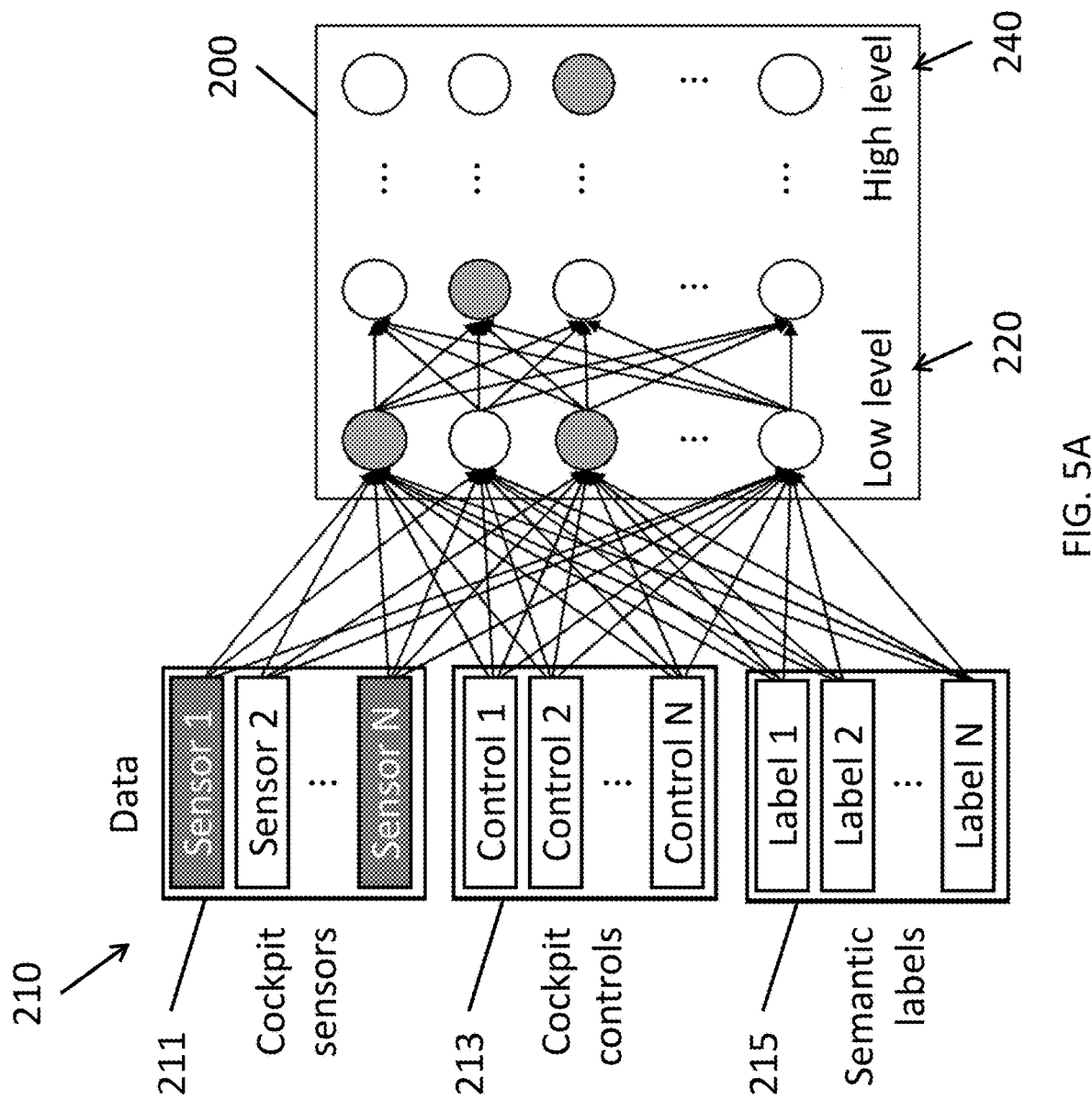
FIGS. 5A and 5B are schematic depictions of, respectively, the information flow from vehicle sensors and cockpit sensors to a neural network to infer a current context and the information flow from the neural network to the cockpit indicators and controls in accordance with one embodiment of the present disclosure.
Figure 5B:
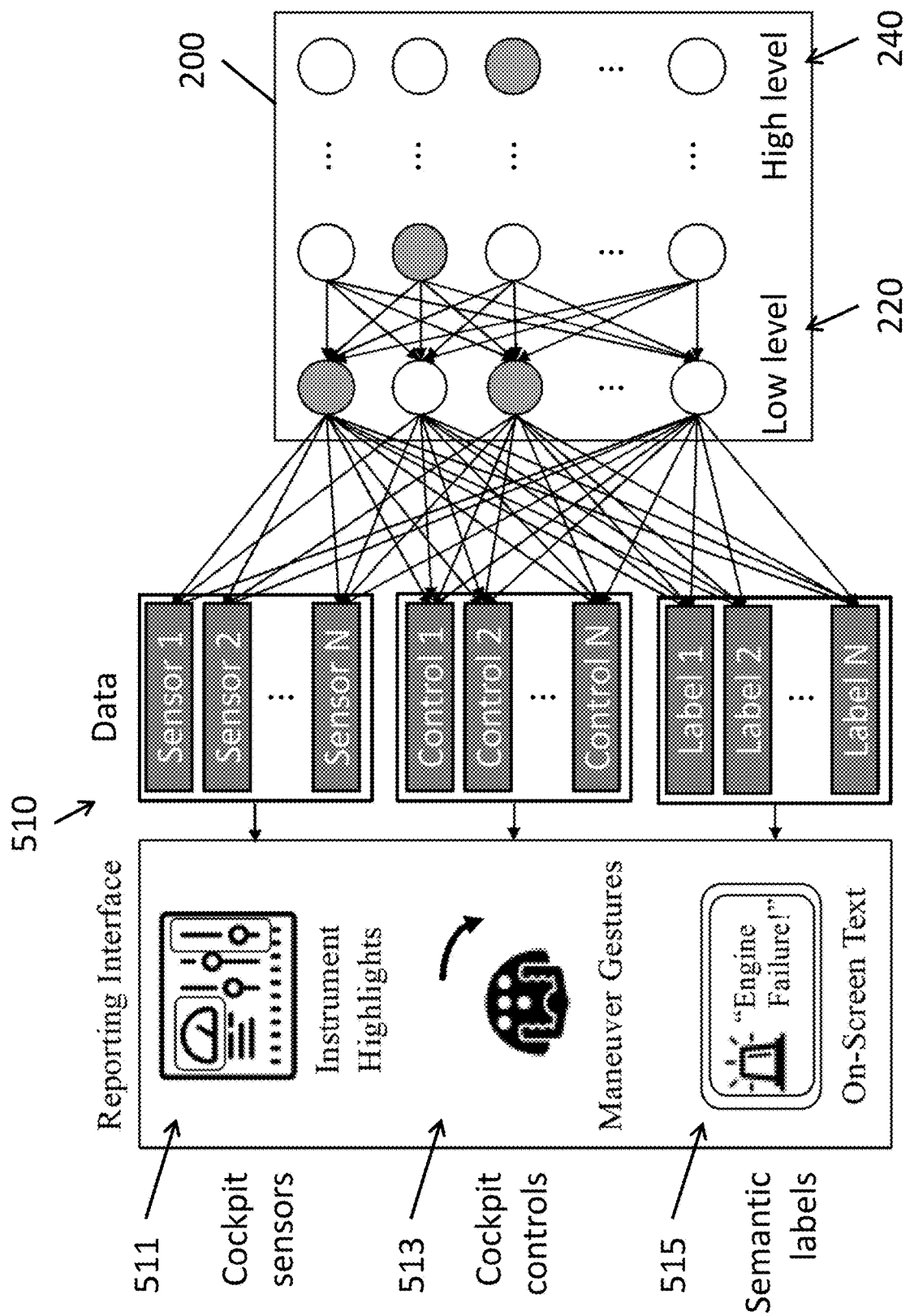

FIGS. 4A and 4B are schematic depictions of information flow through the trained statistical model 200 when it is used to report detected contexts during operation such as while an aircraft is in flight. FIGS. 5A and 5B are schematic depictions of, respectively, the information flow from vehicle sensors and cockpit sensors to a neural network to infer a current context and the information flow from the neural network to the cockpit indicators and controls in accordance with one embodiment of the present disclosure. In 200, shaded values indicate nodes of high numeric values, forming a contextual index of the input. The shaded values in 210 indicate the input sensor values provided initially during the first phase of information flow, while the shaded values in 510 indicate all values available to the pilot during the second phase of information flow. Elements 211, 213, and 215 represent raw input value types, while elements 511, 513, and 515 form the physical reporting interface through which the information from 510 is reported to the pilot.

During flight, contexts are recognized by the neural network and reported to the pilot. As shown in FIGS. 4A and 5A, in order to recognize the context, a collection of inputs representing the current state of the plane is input to the neural network 200. As shown in FIG. 4A, to detect a context, the input v is held at a fixed datapoint (as indicated by bars in the input nodes v) representing the state of the vehicle (e.g., aircraft). The collection of sensor data may be partial, with missing inputs. For instance, as shown in FIG. 5A, the sensor inputs may include only the shaded sensors (e.g., Sensor 1 and Sensor N) and all of the other inputs may be null or otherwise not present. Information flows from the input to the output h, such that the activation of each unit in h represents the detection strength of a context. Accordingly, the statistical model 200 matches the inputs to the closest known hierarchy of contexts.

When reporting the detected or inferred context, information from the neural network 200 flows backwards, reconstructing plausible values for any missing inputs. To reconstruct the sensor information based on the current context, as shown in FIG. 4B, h is held at its new value, and information flows back to v. This reconstructs the inputs that are most associated with the active contexts, and can be used to report the context back to the cockpit. As a more specific example, as shown in FIG. 5B, the data values that were missing in FIG. 5A (such as Sensor 2, Control 1 through Control N, and Label 1 through Label N) are reconstructed from the context. Using the reconstructed inputs allows the known current input values from existing sensors to correct errors (e.g., detect malfunctioning sensors that are reporting information different from the predicted values), filter noise, and fill information gaps present in the original data (e.g., due to failing sensors or the lack of particular sensors in a particular vehicle). Once reconstruction values are obtained for a particular context, the mean reconstruction value of all context detections may be subtracted from it, providing a measure of relevance for each data value. These relevance scores may be used to determine priority for highlighting information presented to the pilot.

Figure 6:
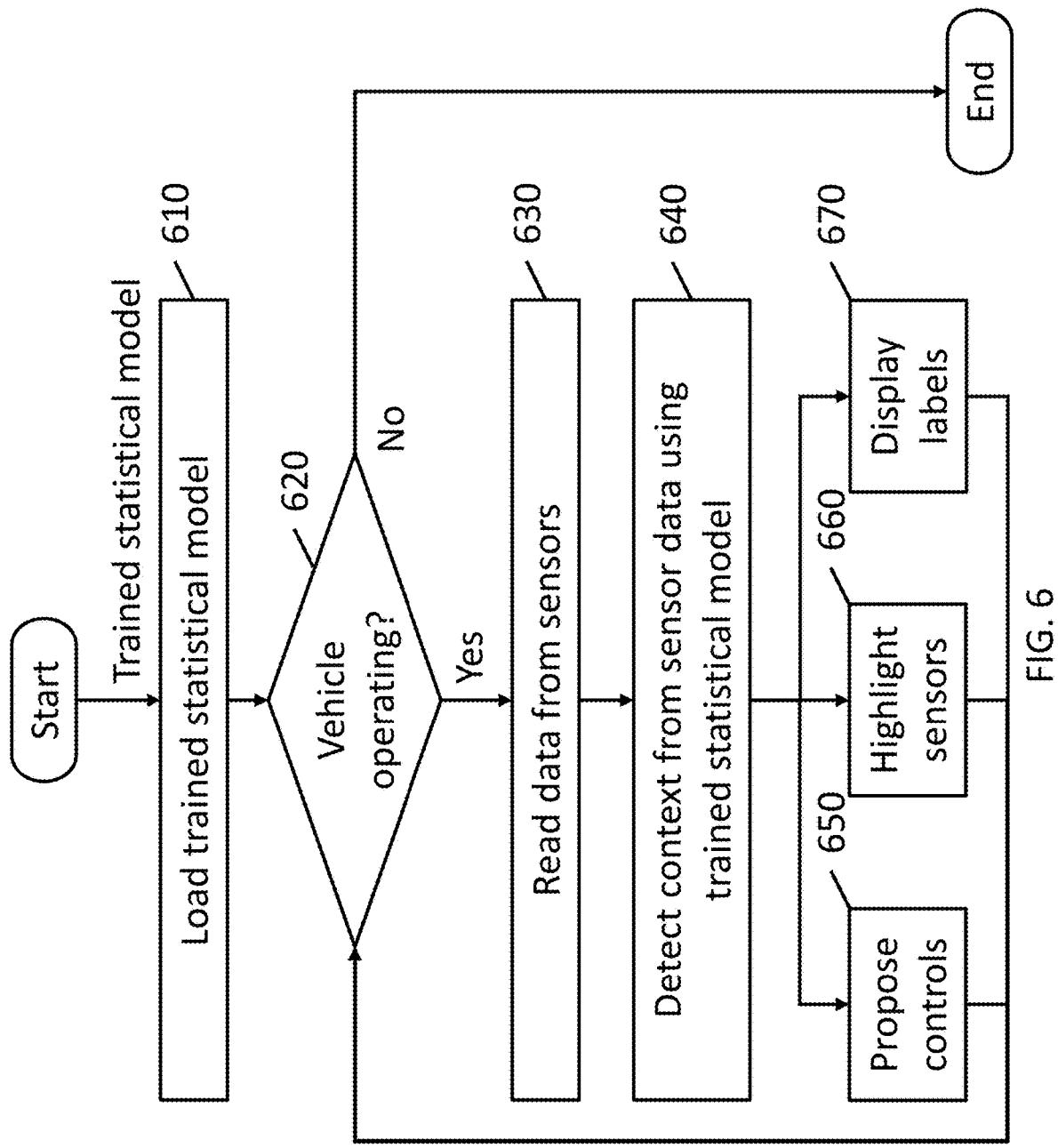
FIG. 6 is a flowchart of a method for detecting a context and generating pilot support information using a pilot support system according to one embodiment of the present disclosure.

FIG. 6 is a flowchart of a method for detecting a context and generating pilot support information using a pilot support system according to one embodiment of the present disclosure. Embodiments of the present disclosure may be used in operation phase during real world or simulated operation (e.g., a real flight or a flight in a flight simulator for training). In operation 610, the pilot support system 100 loads a trained statistical model (e.g., a model trained in accordance with the method shown in FIG. 3). The pilot support system 100 enters a loop, where in operation 620 the pilot support system 100 determines whether the vehicle is currently operating (e.g., whether the aircraft is currently in a flight). If not, then the process ends and the pilot support system 100 terminates operation.

If the vehicle is currently operating, then in operation 630 data is read from the sensors. The data from the sensors of the vehicle are collected in the same format that was used to train the context detection model (e.g., the data may be encoded in a manner similar to that described above with respect to FIG. 3). In operation 640, the pilot support system 100 detects the context by supplying the encoded inputs to the trained statistical model 200. The model generates controls, sensor values, and labels related to the context that it detects, and thus the context is then reported to the human pilot by proposing control actions to address the context in operation 650, visually highlighting sensors relevant to the context in operation 660, and displaying semantic labels for better human understanding in operation 670. The pilot support system 100 continues to operation 620 to continue the loop for the rest of the period of operation (e.g., for the duration of the flight).

Reporting Interface

As noted above, in various embodiments of the present disclosure, the information generated by the pilot support system 100, such as the proposed control actions, the visual highlights of sensors relevant to the contexts, and the semantic labels, are conveyed back to the pilot according to the original categories of input data. For inputs based on cockpit sensors, the information is conveyed by visually or aurally bringing aspects of the cockpit sensors to attention. For example, indicator lights placed adjacent to or in-line with the particular instruments may be illuminated or set to blink to draw the pilot's attention to those instruments. In some embodiments in which a digital display panel (e.g., a compute display panel) is used to display instrument data, the pilot assistance system 100 may highlight particular controls by increasing the prominence of those instruments in the display, such as by reducing the brightness of other instruments, increasing the brightness of the relevant instruments, increasing the relative physical size of relevant instruments on the display panel, or generating a customized instrument panel that displays the currently most relevant sensor data for the current context.

For information based on controls 30, suggested maneuvers that are associated with the context are may be conveyed to the pilot through movement arrows. For example, various controls 30 may include indicator arrows that illuminate or blink in the direction suggested by the pilot support system 100. As another example, a digital display in the cockpit may display a visual representation of the control to be actuated and show an animation of the recommended direction of actuation of the control. As additional examples, tactile feedback may be provided to the pilot, such as a vibration or other physical actuation of the control to indicate that the pilot support system 100 recommends movement of a control in a particular direction.

For information based on semantic labels associated with the contexts, in some embodiments, text-based cues are displayed on-screen within a panel in the cockpit. In some embodiments, the text-based cues are overlaid as a part of a head-up display for the pilot. In some embodiments, symbols are used to represent the various contexts, instead of text-based semantic labels.

In addition, in other embodiments of the present disclosure, additional information may be provided to the pilot through other user interface elements within the cockpit 20, such as auditory cues for particular controls, as well as other types of controlled illumination cues (e.g., spotlights to highlight particular controls).

Continuing the concrete example introduced above, the trained statistical model or neural network 200 is used during an operation phase, where real-time sensor data from the simulation is supplied to the neural network 200 through a pilot support system 100. In response, the pilot support system 100 reported turbulence information in real time to the pilot through a textual display of the word "Turbulence" on-screen when the neural network determined the sensory data to come from a stormy condition.

The simulator or software on the aircraft sends information about the controls as well as the aircrafts position data into the pilot support system 100 which prepares the data by encoding the inputs for the neural network 200, such as by calculating the mean, max, min, and norm of the data over a given time window (e.g., of the past 1 second of data). In some embodiments of the present disclosure, the inputs to the pilot support system 100 are independent of any actual actions taken by the pilot and report only based on the current state of the sensor measurements and/or the measurements of the positions of the controls.

The neural network categorizes the current state of the vehicle from the available information to detect relevant vehicle contexts it has been trained on. In this example, the neural network was trained on stormy weather versus clear weather, but the approach is general enough to operate in a substantially similar manner for other contexts, and under overlapping contexts can occur concurrently (e.g., engine failure and turbulence are independent contexts).

Accordingly, the example embodiment of the invention is able to report flight contexts to a pilot in substantially real-time. During stormy contexts, the neural network correctly detects the context with over 90% accuracy, and reports the detected contexts by displaying the semantic data on screen via text.

Therefore, aspects of embodiments of the present disclosure relate to systems and methods for providing pilot support by automatically considering data from a plurality of different vehicle sensors and a plurality of different cockpit sensors regarding the current state of the controls in the cockpit. In more detail, embodiments of the present disclosure use training data captured from operation of an aircraft by an expert pilot (either in simulation or in real-world flight) to train a statistical model such as a neural network to detect contexts and organize the contexts into hierarchical clusters. The various clusters represent different types of circumstances experienced by the vehicle during operation, and in which different information may be of particular relevance to the pilot during those periods. As such, instruments of relevance and suggested actuations of controls may be automatically reported to a pilot, thereby improving pilot performance.

Computer Systems

Figure 7:
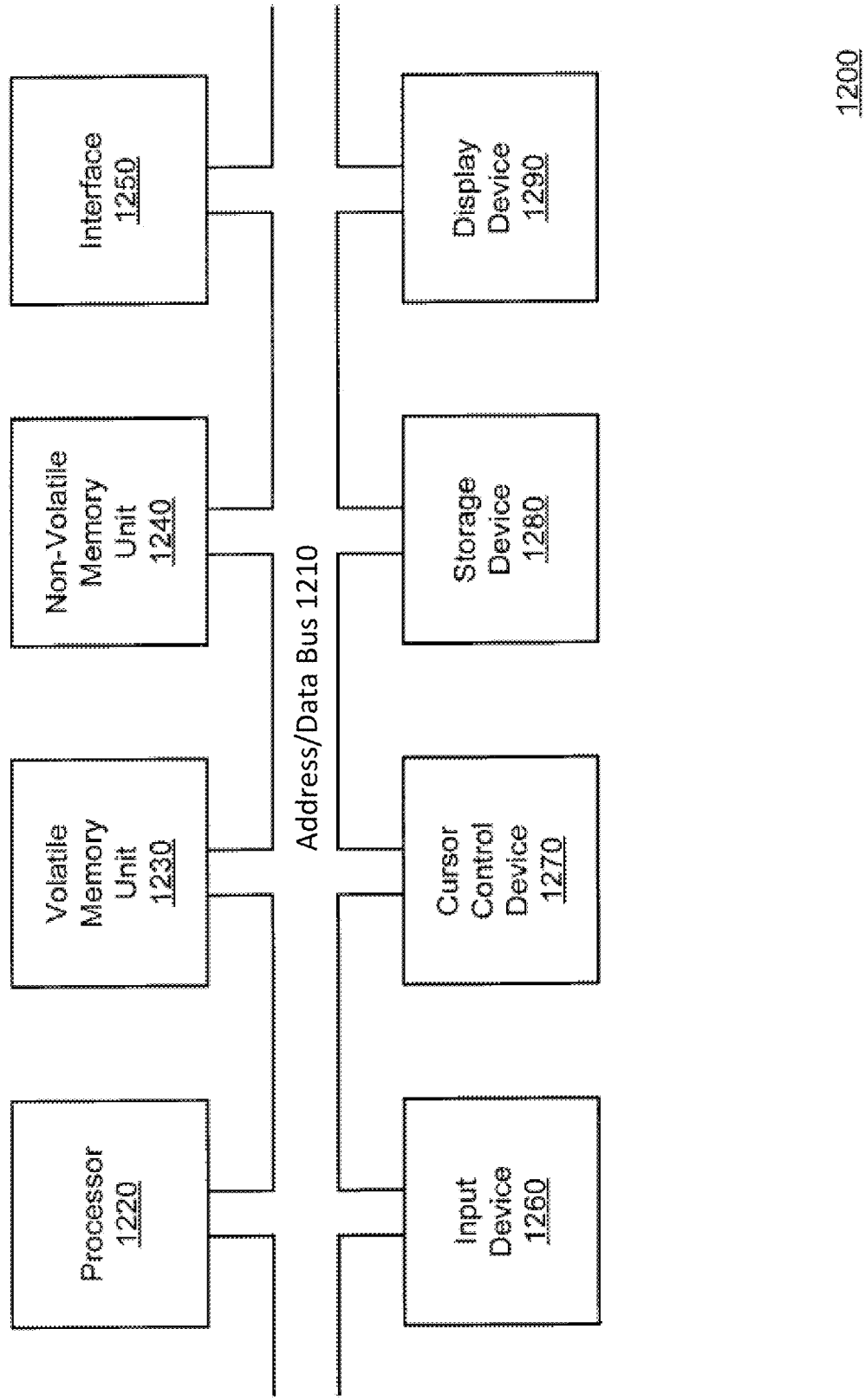
FIG. 7 is a block diagram of a computer system that may be used in conjunction with embodiments of the present invention.

An exemplary computer system 1200 in accordance with an embodiment is shown in FIG. 7. Computer systems similar to those described herein may be used, for example, to implement the model training system described above, and/or trained models in pre-deployment and in deployment, but embodiments of the present invention are not limited thereto. The exemplary computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of the exemplary computer system 1200. When executed, the instructions cause the exemplary computer system 1200 to perform specific actions and exhibit specific behavior, such as described herein.

The exemplary computer system 1200 may include an address/data bus 1210 that is configured to communicate information. Additionally, one or more data processing units, such as a processor 1220, are coupled with the address/data bus 1210. The processor 1220 is configured to process information and instructions. In an embodiment, the processor 1220 is a microprocessor. Alternatively, the processor 1220 may be a different type of processor, such as a parallel processor or a field programmable gate array.

The exemplary computer system 1200 is configured to utilize one or more data storage units. The exemplary computer system 1200 may include a volatile memory unit 1230 (e.g., random access memory ("RAM"), static RAM, dynamic RAM, etc.) coupled with the address/data bus 1210, wherein the volatile memory unit 1230 is configured to store information and instructions for the processor 1220. The exemplary computer system 1200 further may include a non-volatile memory unit 1240 (e.g., read-only memory ("ROM"), programmable ROM ("PROM"), erasable programmable ROM ("EPROM"), electrically erasable programmable ROM ("EEPROM"), flash memory, etc.) coupled with the address/data bus 1210, wherein the non-volatile memory unit 1240 is configured to store static information and instructions for the processor 1220. Alternatively, the exemplary computer system 1200 may execute instructions retrieved from an online data storage unit, such as in "cloud" computing. In an embodiment, the exemplary computer system 1200 also may include one or more interfaces, such as an interface 1250, coupled with the address/data bus 1210. The one or more interfaces are configured to enable the exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, the exemplary computer system 1200 may include an input device 1260 coupled with the address/data bus 1210, wherein the input device 1260 is configured to communicate information and command selections to the processor 1220. In accordance with one embodiment, the input device 1260 is an alphanumeric input device, such as a keyboard, that may include alphanumeric and/or function keys. Alternatively, the input device 1260 may be an input device other than an alphanumeric input device. In an embodiment, the exemplary computer system 1200 may include a cursor control device 1270 coupled with the address/data bus 1210, wherein the cursor control device 1270 is configured to communicate user input information and/or command selections to the processor 1220. In an embodiment, the cursor control device 1270 is implemented utilizing a device such as a mouse, a track-ball, a track-pad, an optical tracking device, or a touchscreen. The foregoing notwithstanding, in an embodiment, the cursor control device 1270 is directed and/or activated via input from the input device 1260, such as in response to the use of special keys and key sequence commands associated with the input device 1260. In an alternative embodiment, the cursor control device 1270 is configured to be directed or guided by voice commands.

Figure 8:
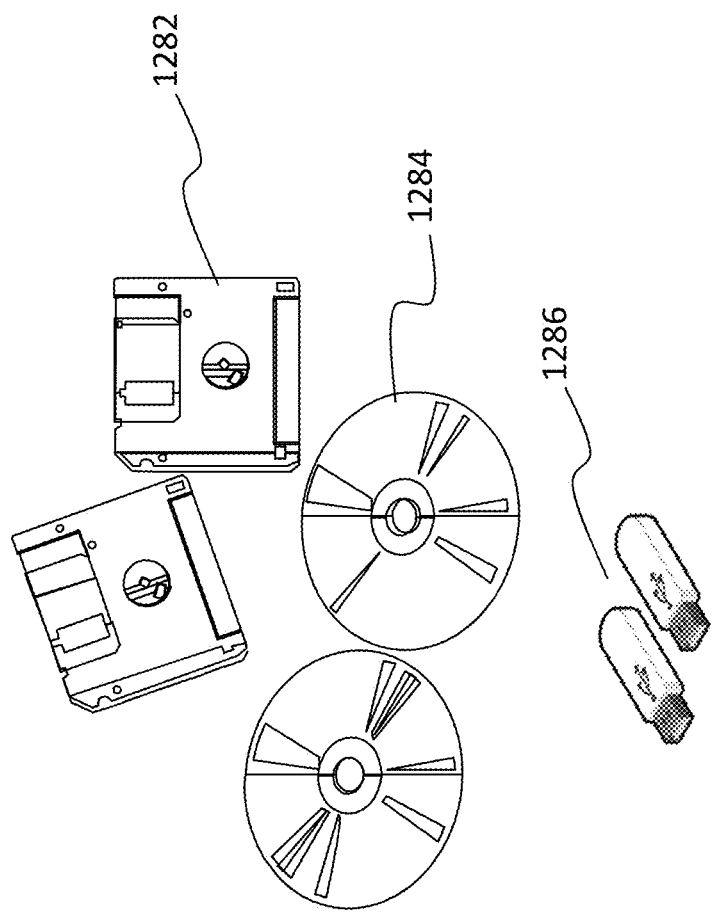
FIG. 8 is a depiction of some forms of non-volatile storage media.

In an embodiment, the exemplary computer system 1200 further may include one or more optional computer usable data storage devices, such as a storage device 1280, coupled with the address/data bus 1210. The storage device 1280 is configured to store information and/or computer executable instructions. In one embodiment, as shown in FIG. 8, the storage device 1280 is a storage device such as a magnetic or optical disk drive (e.g., hard disk drive ("HDD"), floppy diskette 1282, compact disc read-only memory ("CD-ROM") 1284, digital versatile disc ("DVD")), or flash memory (e.g., NAND flash in the form of a USB drive) 1286. Pursuant to one embodiment, a display device 1290 is coupled with the address/data bus 1210, wherein the display device 1290 is configured to display video and/or graphics. In an embodiment, the display device 1290 may include a cathode ray tube ("CRT"), liquid crystal display ("LCD"), field emission display ("FED"), plasma display, or any other display device suitable for displaying video and/or graphic images and alphanumeric characters recognizable to a user.

The exemplary computer system 1200 is presented herein as an exemplary computing environment in accordance with an embodiment. However, the exemplary computer system 1200 is not strictly limited to being a computer system. For example, an embodiment provides that the exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented utilizing computer-executable instructions, such as program modules, being executed by a computer. In one exemplary implementation, such program modules include routines, programs, objects, components, and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pilot support system comprising:
   a processing circuit; and
   memory storing instructions that, when executed by the processing circuit, cause the processing circuit to:
   receive input data regarding a current state of a vehicle;
   encode the input data to generate encoded input data comprising a plurality of vectors of summary values computed from the input data, comprising:
   binning the input data into time windows, each time window including a plurality of data samples of the input data; and
   computing the plurality of vectors of summary values, each vector of the plurality of vectors of summary values being computed based on the plurality of data samples binned into a corresponding one of the time windows;
   supply the plurality of vectors of summary values of the encoded input data to a trained statistical model configured to cluster data corresponding to a current operational state of the vehicle into different contexts of the vehicle;

compute a current context of the vehicle based on the plurality of vectors of summary values of the encoded input data using the trained statistical model;

compute one or more pilot feedback indicators based on the current context using the trained statistical model; and provide the one or more pilot feedback indicators to a cockpit of the vehicle.

2. The pilot support system of claim 1, wherein the trained statistical model comprises a neural network.

3. The pilot support system of claim 2, wherein the neural network comprises a Restricted Boltzmann Machine.

4. The pilot support system of claim 1, wherein the input data comprises cockpit sensor data and cockpit controls data.

5. The pilot support system of claim 4, wherein the vehicle is an aircraft,
wherein the cockpit sensor data comprises: aircraft pitch and aircraft yaw, and
wherein the cockpit controls data comprises: flight stick position.

6. The pilot support system of claim 1, wherein the trained statistical model is trained using training data corresponding to operation of a vehicle by a pilot, the training data comprising:
training sensor data;
training cockpit control data; and
semantic labels associated with different contexts.

7. The pilot support system of claim 1, wherein the vector of summary values comprises:
a mean;
a maximum; and
a minimum.

8. The pilot support system of claim 1, wherein the pilot feedback indicators comprise instruments relevant to the current context, and
wherein the instructions to provide the one or more pilot feedback indicators comprise instructions that, when executed by the processing circuit, cause the processing circuit to illuminate lights associated with the instruments relevant to the current context.

9. The pilot support system of claim 1, wherein the pilot feedback indicators comprise proposed control actuations, and
wherein the instructions to provide the one or more pilot feedback indicators comprise instructions that, when executed by the processing circuit, cause the processing circuit to display a proposed direction for a cockpit control to be actuated.

10. The pilot support system of claim 1, wherein the pilot feedback indicators comprise a semantic label, and
wherein the instructions to provide the one or more pilot feedback indicators comprise instructions that, when executed by the processing circuit, cause the processing circuit to display the semantic label on a display device in the cockpit.

11. A method for providing feedback to a pilot, the method comprising:
receiving, by a processing circuit, input data regarding a current state of a vehicle operated by the pilot;
encoding, by the processing circuit, the input data to generate encoded input data comprising a plurality of vectors of summary values computed from the input data, the generating the encoded input data comprising:
binning the input data into time windows, each time window including a plurality of data samples of the input data; and
computing the plurality of vectors of summary values, each vector of the plurality of vectors of summary values being computed based on the plurality of data samples binned into a corresponding one of the time windows;

supplying, by the processing circuit, the plurality of vectors of summary values of the encoded input data to a trained statistical model configured to cluster data corresponding to a current operational state of the vehicle into different contexts of the vehicle;

computing, by the processing circuit, a current context of the vehicle based on the plurality of vectors of summary values of the encoded input data using the trained statistical model;

computing, by the processing circuit, one or more pilot feedback indicators based on the current context using the trained statistical model; and providing, by the processing circuit, the one or more pilot feedback indicators to a cockpit of the vehicle.

12. The method of claim 11, wherein the trained statistical model comprises a neural network.

13. The method of claim 12, wherein the neural network comprises a Restricted Boltzmann Machine.

14. The method of claim 11, wherein the input data comprises cockpit sensor data and cockpit controls data.

15. The method of claim 14, wherein the vehicle is an aircraft,
wherein the cockpit sensor data comprises: aircraft pitch and aircraft yaw, and
wherein the cockpit controls data comprises: flight stick position.

16. The method of claim 11, wherein the trained statistical model is trained using training data corresponding to operation of a vehicle by a pilot, the training data comprising:
training sensor data;
training cockpit control data; and
semantic labels associated with different contexts.

17. The method of claim 11, wherein
the vector of summary values comprises:
a mean;
a maximum; and
a minimum.

18. The method of claim 11, wherein the pilot feedback indicators comprise instruments relevant to the current context, and
wherein the providing the one or more pilot feedback indicators comprises illuminating lights associated with the instruments relevant to the current context.

19. The method of claim 11, wherein the pilot feedback indicators comprise proposed control actuations, and
wherein the providing the one or more pilot feedback indicators comprises displaying a proposed direction for a cockpit control to be actuated.

20. The method of claim 11, wherein the pilot feedback indicators comprise a semantic label, and
wherein the providing the one or more pilot feedback indicators comprises displaying the semantic label on a display device in the cockpit.

* * * * *